US008959119B2

(12) United States Patent
Adams et al.

(10) Patent No.: US 8,959,119 B2
(45) Date of Patent: Feb. 17, 2015

(54) CONTEXT-BASED GRAPH-RELATIONAL INTERSECT DERIVED DATABASE

(75) Inventors: Samuel S. Adams, Rutherfordton, NC (US); Robert R. Friedlander, Southbury, CT (US); John K. Gerken, III, Apex, NC (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 13/595,356

(22) Filed: Aug. 27, 2012

(65) Prior Publication Data
US 2014/0059084 A1  Feb. 27, 2014

(51) Int. Cl.
*G06F 17/30* (2006.01)

(52) U.S. Cl.
USPC ............................ 707/798; 792/793; 792/794

(58) Field of Classification Search
USPC .......................... 707/790, 792, 793, 794, 798
See application file for complete search history.

(56) References Cited

U.S. PATENT DOCUMENTS

| 5,450,535 | A | 9/1995 | North |
| 5,664,179 | A | 9/1997 | Tucker |
| 5,689,620 | A | 11/1997 | Kopec et al. |
| 5,701,460 | A | 12/1997 | Kaplan et al. |
| 5,974,427 | A | 10/1999 | Reiter |
| 6,199,064 | B1 | 3/2001 | Schindler |
| 6,275,833 | B1 | 8/2001 | Nakamura et al. |
| 6,314,555 | B1 | 11/2001 | Ndumu et al. |
| 6,334,156 | B1 | 12/2001 | Matsuoka et al. |
| 6,553,371 | B2 * | 4/2003 | Gutierrez-Rivas et al. ........... 1/1 |
| 6,633,868 | B1 | 10/2003 | Min et al. |
| 6,768,986 | B2 | 7/2004 | Cras et al. |
| 7,058,628 | B1 | 6/2006 | Page |
| 7,337,174 | B1 | 2/2008 | Craig |

(Continued)

FOREIGN PATENT DOCUMENTS

| EP | 1566752 A2 | 8/2005 |
| EP | 1843259 A2 | 10/2007 |

(Continued)

OTHER PUBLICATIONS

Sarfaz Alam "Interoperability of Security-Enabled Iniernet of Things" Aug. 30, 2011.*

(Continued)

*Primary Examiner* — Hosain Alam
*Assistant Examiner* — Ahmed Abraham
(74) *Attorney, Agent, or Firm* — John R. Pivnichny; Law Office of Jim Boice (57) ABSTRACT

A context-based graph-relational intersect derived (CB-GRID) links a real entity graph node to a synthetic entity graph node. The real entity graph node comprises a pointer to a primary key in a first tuple that non-contextually describes the real entity. A primary relational database comprises the first tuple that non-contextually describes the real entity. A context relational database comprises a second tuple that contains a foreign key that matches the primary key in the primary relational database. The second tuple dynamically describes a context of data in the first tuple. A contextual entity relational database comprises a third tuple that contains data from the first tuple and the second tuple. The synthetic entity graph node describes a synthetic entity that is described by data in the third tuple, such that the contextual entity relational database links the real entity graph node to the synthetic entity graph node.

10 Claims, 8 Drawing Sheets

(56) References Cited

U.S. PATENT DOCUMENTS

| | | | |
|---|---|---|---|
| 7,441,264 B2 | 10/2008 | Himmel et al. | |
| 7,523,118 B2 | 4/2009 | Friedlander et al. | |
| 7,523,123 B2 | 4/2009 | Yang et al. | |
| 7,571,163 B2 | 8/2009 | Trask | |
| 7,702,605 B2 | 4/2010 | Friedlander et al. | |
| 7,748,036 B2 | 6/2010 | Speirs, III et al. | |
| 7,752,154 B2 | 7/2010 | Friedlander et al. | |
| 7,778,955 B2 | 8/2010 | Kuji | |
| 7,783,586 B2 | 8/2010 | Friedlander et al. | |
| 7,788,202 B2 | 8/2010 | Friedlander et al. | |
| 7,788,203 B2 | 8/2010 | Friedlander et al. | |
| 7,792,774 B2 | 9/2010 | Friedlander et al. | |
| 7,792,776 B2 | 9/2010 | Friedlander et al. | |
| 7,792,783 B2 | 9/2010 | Friedlander et al. | |
| 7,797,319 B2 | 9/2010 | Piedmonte | |
| 7,805,390 B2 | 9/2010 | Friedlander et al. | |
| 7,805,391 B2 | 9/2010 | Friedlander et al. | |
| 7,809,660 B2 | 10/2010 | Friedlander et al. | |
| 7,853,611 B2 | 12/2010 | Friedlander et al. | |
| 7,870,113 B2 | 1/2011 | Gruenwald | |
| 7,877,682 B2 | 1/2011 | Aegerter | |
| 7,930,262 B2 | 4/2011 | Friedlander et al. | |
| 7,953,686 B2 | 5/2011 | Friedlander et al. | |
| 7,970,759 B2 | 6/2011 | Friedlander et al. | |
| 7,996,393 B1 | 8/2011 | Nanno et al. | |
| 8,046,358 B2 | 10/2011 | Thattil | |
| 8,055,603 B2 | 11/2011 | Angell et al. | |
| 8,069,188 B2 | 11/2011 | Larson et al. | |
| 8,086,614 B2 | 12/2011 | Novy | |
| 8,145,582 B2 | 3/2012 | Angell et al. | |
| 8,150,882 B2 | 4/2012 | Meek et al. | |
| 8,155,382 B2 | 4/2012 | Rubenstein | |
| 8,161,048 B2 | 4/2012 | Procopiuc et al. | |
| 8,199,982 B2 | 6/2012 | Fueyo et al. | |
| 8,234,285 B1 | 7/2012 | Cohen | |
| 8,250,581 B1 | 8/2012 | Blanding et al. | |
| 8,341,626 B1 | 12/2012 | Gardner et al. | |
| 8,447,273 B1 | 5/2013 | Friedlander et al. | |
| 2002/0111792 A1 | 8/2002 | Cherny | |
| 2002/0184401 A1 | 12/2002 | Kadel et al. | |
| 2003/0065626 A1 | 4/2003 | Allen | |
| 2003/0088576 A1 | 5/2003 | Hattori et al. | |
| 2003/0149562 A1 | 8/2003 | Walther | |
| 2004/0111410 A1* | 6/2004 | Burgoon et al. | 707/4 |
| 2004/0153461 A1 | 8/2004 | Brown et al. | |
| 2004/0162838 A1 | 8/2004 | Murayama et al. | |
| 2004/0249789 A1* | 12/2004 | Kapoor et al. | 707/2 |
| 2005/0050030 A1 | 3/2005 | Gudbjartsson et al. | |
| 2005/0165866 A1* | 7/2005 | Bohannon et al. | 707/203 |
| 2005/0273730 A1 | 12/2005 | Card et al. | |
| 2006/0004851 A1 | 1/2006 | Gold et al. | |
| 2006/0036568 A1 | 2/2006 | Moore et al. | |
| 2006/0190195 A1 | 8/2006 | Watanabe et al. | |
| 2006/0197762 A1 | 9/2006 | Smith et al. | |
| 2006/0256010 A1 | 11/2006 | Tanygin et al. | |
| 2006/0271586 A1 | 11/2006 | Federighi et al. | |
| 2006/0290697 A1 | 12/2006 | Madden et al. | |
| 2007/0006321 A1 | 1/2007 | Bantz et al. | |
| 2007/0016614 A1* | 1/2007 | Novy | 707/104.1 |
| 2007/0073734 A1* | 3/2007 | Doan et al. | 707/100 |
| 2007/0079356 A1 | 4/2007 | Grinstein | |
| 2007/0136048 A1 | 6/2007 | Richardson-Bunbury et al. | |
| 2007/0185850 A1 | 8/2007 | Walters et al. | |
| 2007/0282916 A1 | 12/2007 | Albahari et al. | |
| 2007/0300077 A1 | 12/2007 | Mani et al. | |
| 2008/0065655 A1* | 3/2008 | Chakravarthy et al. | 707/100 |
| 2008/0066175 A1 | 3/2008 | Dillaway et al. | |
| 2008/0086442 A1* | 4/2008 | Dasdan et al. | 707/1 |
| 2008/0091503 A1 | 4/2008 | Schirmer et al. | |
| 2008/0133474 A1 | 6/2008 | Hsiao et al. | |
| 2008/0172715 A1 | 7/2008 | Geiger et al. | |
| 2008/0208813 A1 | 8/2008 | Friedlander et al. | |
| 2008/0208838 A1 | 8/2008 | Friedlander et al. | |
| 2008/0208901 A1 | 8/2008 | Friedlander et al. | |
| 2008/0281801 A1 | 11/2008 | Larson et al. | |
| 2008/0306926 A1 | 12/2008 | Friedlander et al. | |
| 2009/0024553 A1 | 1/2009 | Angell et al. | |
| 2009/0064300 A1 | 3/2009 | Bagepalli et al. | |
| 2009/0125546 A1 | 5/2009 | Iborra et al. | |
| 2009/0144609 A1 | 6/2009 | Liang et al. | |
| 2009/0164649 A1 | 6/2009 | Kawato | |
| 2009/0165110 A1 | 6/2009 | Becker et al. | |
| 2009/0287676 A1 | 11/2009 | Dasdan | |
| 2009/0299988 A1 | 12/2009 | Hamilton, II et al. | |
| 2009/0327632 A1 | 12/2009 | Glaizel et al. | |
| 2010/0070640 A1 | 3/2010 | Allen et al. | |
| 2010/0088322 A1 | 4/2010 | Chowdhury et al. | |
| 2010/0131293 A1 | 5/2010 | Linthicum et al. | |
| 2010/0179933 A1 | 7/2010 | Bai et al. | |
| 2010/0191747 A1 | 7/2010 | Ji et al. | |
| 2010/0241644 A1* | 9/2010 | Jackson et al. | 707/760 |
| 2010/0257198 A1 | 10/2010 | Cohen et al. | |
| 2010/0274785 A1 | 10/2010 | Procopiuc et al. | |
| 2011/0040724 A1 | 2/2011 | Dircz | |
| 2011/0066649 A1 | 3/2011 | Berlyant et al. | |
| 2011/0077048 A1 | 3/2011 | Busch | |
| 2011/0087678 A1 | 4/2011 | Frieden et al. | |
| 2011/0123087 A1 | 5/2011 | Nie et al. | |
| 2011/0137882 A1 | 6/2011 | Weerasinghe | |
| 2011/0194744 A1 | 8/2011 | Wang et al. | |
| 2011/0208688 A1 | 8/2011 | Ivanov et al. | |
| 2011/0246483 A1* | 10/2011 | Darr et al. | 707/748 |
| 2011/0246498 A1 | 10/2011 | Forster | |
| 2011/0282888 A1 | 11/2011 | Koperski et al. | |
| 2011/0301967 A1 | 12/2011 | Friedlander et al. | |
| 2011/0314155 A1 | 12/2011 | Narayanaswamy et al. | |
| 2012/0004891 A1* | 1/2012 | Rameau et al. | 703/6 |
| 2012/0016715 A1 | 1/2012 | Brown et al. | |
| 2012/0023141 A1* | 1/2012 | Holster | 707/798 |
| 2012/0072468 A1 | 3/2012 | Anthony et al. | |
| 2012/0079493 A1 | 3/2012 | Friedlander et al. | |
| 2012/0110004 A1* | 5/2012 | Meijer | 707/769 |
| 2012/0131139 A1* | 5/2012 | Siripurapu et al. | 709/217 |
| 2012/0131468 A1 | 5/2012 | Friedlander et al. | |
| 2012/0191704 A1 | 7/2012 | Jones | |
| 2012/0209858 A1 | 8/2012 | Lamba et al. | |
| 2012/0221439 A1 | 8/2012 | Sundaresan et al. | |
| 2012/0233194 A1* | 9/2012 | Ohyu et al. | 707/758 |
| 2012/0239761 A1 | 9/2012 | Linner et al. | |
| 2012/0240080 A1 | 9/2012 | O'Malley | |
| 2012/0246148 A1 | 9/2012 | Dror | |
| 2012/0259841 A1 | 10/2012 | Hsiao et al. | |
| 2012/0278897 A1 | 11/2012 | Ang et al. | |
| 2012/0281830 A1 | 11/2012 | Stewart et al. | |
| 2012/0290950 A1 | 11/2012 | Rapaport et al. | |
| 2012/0297278 A1 | 11/2012 | Gattani et al. | |
| 2012/0311587 A1 | 12/2012 | Li et al. | |
| 2012/0316821 A1 | 12/2012 | Levermore et al. | |
| 2012/0330958 A1 | 12/2012 | Xu et al. | |
| 2013/0019084 A1 | 1/2013 | Orchard et al. | |
| 2013/0031302 A1 | 1/2013 | Byom et al. | |
| 2013/0060696 A1 | 3/2013 | Martin et al. | |
| 2013/0103389 A1 | 4/2013 | Gattani et al. | |
| 2013/0124564 A1 | 5/2013 | Oztekin et al. | |
| 2013/0173585 A1 | 7/2013 | Friedlander et al. | |
| 2013/0238667 A1* | 9/2013 | Carvalho et al. | 707/798 |
| 2013/0291098 A1* | 10/2013 | Chung et al. | 726/21 |
| 2013/0326412 A1 | 12/2013 | Treiser | |
| 2014/0012884 A1* | 1/2014 | Bornea et al. | 707/798 |
| 2014/0025702 A1* | 1/2014 | Curtiss et al. | 707/769 |
| 2014/0046981 A1 | 2/2014 | Adams et al. | |
| 2014/0214871 A1 | 7/2014 | Adams et al. | |

FOREIGN PATENT DOCUMENTS

| | | |
|---|---|---|
| WO | 2006086179 A2 | 8/2006 |
| WO | 2007044763 A2 | 4/2007 |

OTHER PUBLICATIONS

"Ninth New Collegiate Dictionary", Merriam-Webster Inc., 1991, pp. 77 and 242.

"The American Heritage College Dictionary", Fourth Edition, Houghton Mifflin Company, 2004, pp. 44 and 262.

(56) References Cited

OTHER PUBLICATIONS

U.S. Appl. No. 13/680,832—Non-Final Office Action Mailed Apr. 8, 2014.
U.S. Appl. No. 13/628,853—Notice of Allowance Mailed Mar. 4, 2014.
U.S. Appl. No. 13/540,267—Non-Final Office Action Mailed Feb. 4, 2014.
U.S. Appl. No. 13/540,230—Non-Final Office Action Mailed Jan. 30, 2014.
U.S. Appl. No. 13/540,295—Non-Final Office Action Mailed Jan. 30, 2014.
U.S. Appl. No. 13/609,710—Non-Final Office Action Mailed Jan. 27, 2014.
U.S. Appl. No. 13/342,406—Notice of Allowance Mailed Mar. 20, 2014.
U.S. Appl. No. 13/628,853—Non-Final Office Action Mailed Nov. 7, 2013.
U.S. Appl. No. 13/593,905—Notice of Allowance Mailed Oct. 25, 2013.
U.S. Appl. No. 13/342,406—Non-Final Office Action Mailed Sep. 27, 2013.
U.S. Appl. No. 13/610,347—Non-Final Office Action Mailed Jul. 19, 2013.
U.S. Appl. No. 13/610,347—Notice of Allowance Mailed Aug. 19, 2013.
R. Angles et al., "Survey of Graph Database Models", ACM Computing Surveys, vol. 40, No. 1, Article 1, Feb. 2008, pp. 1-65.
M.J. Flynn, et al., "Sparse Distributed Memory Principles of Operation", Research Institute for Advanced Computer Science, 1989, pp. 1-60.
P. Kanerva, "Hyperdimensional Computing: An Introduction to Computing in Distributed Representation With High-Dimensional Random Vectors", Springer Science+Business Media, LLC, COGN Comput, 1, 2009, pp. 139-159.
P. Kanerva, "What We Mean When We Say "What's the Dollar of Mexico?": Prototypes and Mapping in Concept Space", Quantum Informatics for Cognitive, Social, and Semantic Processes: Papers From the AAAI Fall Symposium, Association for the Advancement of Artificial Intelligence, 2010, pp. 2-6.
M. Yu, et al., "Secure and Robust Error Correction for Physical Unclonable Functions", Verifying Physical Trustworthiness of ICs and Systems, IEEE Design & Test of Computers, IEEE, Jan./Feb. 2010, pp. 48-64.
A. Jin, et al., "Biohashing: Two Factor Authentication Featuring Fingerprint Data and Tokenised Random Number," Pattern Recognition 37, Elsevier Ltd., 2004, pp. 2245-2255.
N. Saxena et al., "Data remanence effects on memory-based entropy collection for RFID systems", International Journal of Information Security 10.4 (2011), pp. 213-222.
A. Birrell et al., "A design for high-performance flash disks." ACM SIGOPS Operating Systems Review 41.2 (2007), pp. 88-93.
Richard Saling, "How to Give a Great Presentation! From the HP Learning Center", Jul. 28, 2008, <http://rsaling.wordpress.com/2008/07/28/how-to-give-a-great-presentation/>, pp. 1-28.
U.S. Appl. No. 13/342,305, Friedlander et al.—Specification Filed Jan. 3, 2012.
K. Matterhorn, "How to Share Data Between a Host Computer & Virtual Machine," EHOW, pp. 1-3, <http://www.ehow.com/how_7385388_share-host-computer-virtual-machine.html>, Retrieved Feb. 17, 2013.
W. Caid et al., "Context Vector-Based Text Retrieval", Fair ISAAC Corporation, Aug. 2003, pp. 1-20.
Anonymous "Fraud Detection Using Data Analytics in the Banking Industry," ACL Services Ltd., 2010, pp. 1-9 <http://www.acl.com/pdfs/DP_Fraud_detection_BANKING.pdf>.
Visual Paradigm, "DB Visual Architect 4.0 Designer's Guide: Chapter 6—Mapping Object Model to Data Model and Vice Versa", 2007, pp. 6-2-6-26.
Lorenzo Alberton, "Graphs in the Database: SQL Meets Social Networks," Techportal, Sep. 7, 2009, http://techportal.inviqa.com/2009/09/07/graphs-in-the-database-sql-meets-social-networks/, pp. 1-11.
Avinash Kaushik, "End of Dumb Tables in Web Analytics Tools! Hello: Weighted Sort", Sep. 7, 2010, www.kaushik.net, pp. 1-15.
Evaggelio Pitoura et al., "Context in Databases", University of Ioannina, Greece, 2004, pp. 1-19.
U.S. Appl. No. 13/562,714, Robert R. Friedlander, et al.—Specification and Drawings Filed Jul. 31, 2012.
Faulkner, Paul, "Common Patterns for Synthetic Events in Websphere Business Events," Jan. 15, 2011, http://www.ibm.com/developerworks/websphere/bpmjournal/1101_faulkner2/1101_faulkner2.html, pp. 1-6.
J. Cheng et al., "Context-Aware Object Connection Discovery in Large Graphs", Data Engineering, 2009. ICDE '09. IEEE 25th International Conference on, pp. 856-867.
U.S. Appl. No. 13/592,905—Non-Final Office Action Mailed May 8, 2013.
U.S. Appl. No. 13/755,623—Notice of Allowance Mailed May 27, 2014.
S. Alam et al., "Interoperability of Security-Enabled Internet of Things", Springer, Wireless Personal Communications, Dec. 2011, vol. 61, pp. 567-586.
U.S. Appl. No. 13/648,801—Non-Final Office Action Mailed Jul. 1, 2014.
U.S. Appl. No. 13/609,710—Final Office Action Mailed Jul. 24, 2014.
U.S. Appl. No. 13/733,052—Non-Final Office Action mailed Sep. 18, 2014.
U.S. Appl. No. 13/861,058—Non-Final Office Action mailed Dec. 11, 2014.

* cited by examiner

CONTEXT-BASED GRAPH-RELATIONAL INTERSECT DERIVED DATABASE

BACKGROUND

The present disclosure relates to the field of computers, and specifically to the use of databases in computers. Still more particularly, the present disclosure relates to the construction and use of databases.

A database is a collection of data. Various types of databases include relational databases, graph databases, network databases, and object-oriented databases. Each type of database presents data in a non-dynamic manner, in which the data is statically stored without contextual meaning

SUMMARY

In one embodiment, a database computer system comprises a context-based graph-relational intersect derived (CB-GRID) database, wherein the CB-GRID database associates a real entity graph node to a synthetic entity graph node. The CB-GRID database in the database computer system comprises: a real entity graph node, wherein the real entity graph node identifies a real entity, and wherein the real entity graph node comprises a pointer to a primary key in a first tuple that non-contextually describes the real entity; a primary relational database, wherein the primary relational database comprises the first tuple that non-contextually describes the real entity, and wherein the first tuple contains the primary key; a context relational database, wherein the context relational database comprises a second tuple that contains a foreign key that matches the primary key in the primary relational database, and wherein the second tuple dynamically describes a context of data in the first tuple; a contextual entity relational database, wherein the contextual entity relational database comprises a third tuple that contains data from the first tuple and the second tuple, and wherein the third tuple comprises a contextual tuple key; and a synthetic entity graph node, wherein the synthetic entity graph node is linked to the contextual entity relational database by the contextual tuple key, wherein the synthetic entity graph node describes a synthetic entity that is described by data in the contextual entity relational database, and wherein the contextual entity relational database links the real entity graph node to the synthetic entity graph node.

In one embodiment, a computer program product and/or a computer system create a context-based graph-relational intersect derived (CB-GRID) database for associating a real entity graph node to a synthetic entity graph node in a database system. The computer program product comprises: a computer readable storage medium; first program instructions to establish a real entity graph node, wherein the real entity graph node identifies a real entity; second program instructions to create and store a pointer in the real entity graph node, wherein the pointer points to a primary key in a first tuple that non-contextually describes the real entity; third program instructions to create a primary relational database, wherein the primary relational database comprises the first tuple that non-contextually describes the real entity, and wherein the first tuple contains the primary key; fourth program instructions to create a context relational database, wherein the context relational database comprises a second tuple that contains a foreign key that matches the primary key in the primary relational database, and wherein the second tuple dynamically describes a context of data in the first tuple; fifth program instructions to create a contextual entity relational database, wherein the contextual entity relational database comprises a third tuple that contains data from the first tuple and the second tuple, and wherein the third tuple comprises a contextual tuple key; and sixth program instructions to create a synthetic entity graph node, wherein the synthetic entity graph node is linked to the contextual entity relational database by the contextual tuple key, wherein the synthetic entity graph node describes a synthetic entity that is described by data in the contextual entity relational database, and wherein the contextual entity relational database links the real entity graph node to the synthetic entity graph node. The first, second, third, fourth, fifth, and sixth program instructions are stored on the computer readable storage medium for execution by a processor in the computer system via a system memory.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
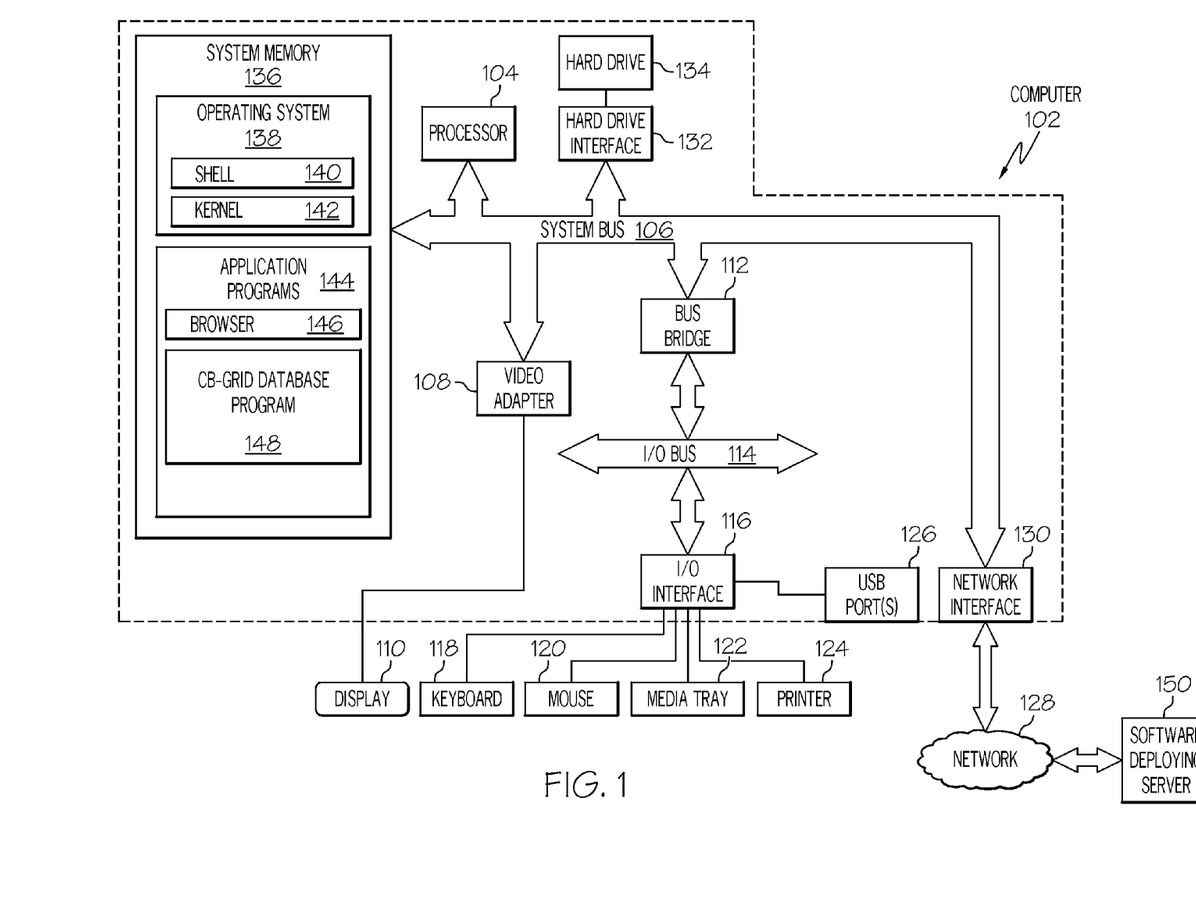
FIG. 1 depicts an exemplary system and network in which the present disclosure may be implemented.

With reference now to the figures, and in particular to FIG. 1, there is depicted a block diagram of an exemplary system and network that may be utilized by and in the implementation of the present invention. Note that some or all of the exemplary architecture, including both depicted hardware and software, shown for and within computer 102 may be utilized by software deploying server 150.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a context-based graph-relational intersect derived (CB-GRID) database program 148. CB-GRID database program 148 includes code for implementing the processes described below, including those described in FIGS. 2-8. In one embodiment, computer 102 is able to download CB-GRID database program 148 from software deploying server 150, including in an on-demand basis, wherein the code in CB-GRID database program 148 is not downloaded until needed for execution. Note further that, in one embodiment of the present invention, software deploying server 150 performs all of the functions associated with the present invention (including execution of CB-GRID database program 148), thus freeing computer 102 from having to use its own internal computing resources to execute CB-GRID database program 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Note that CB-GRID database program 148 is able to generate and/or utilize the context-based graphical databases depicted in FIGS. 2-6.

As understood within the context of the present invention, a relational database is defined as a collection of data items organized through a set of formally described tables. A table is made up of one or more rows, known as "tuples". Each of the tuples share common attributes, which in the table are described by column headings. Each tuple also includes a key, which may be a primary key or a foreign key. A primary key is an identifier (e.g., a letter, number, symbol, etc.) that is stored in a first data cell of a local tuple. A foreign key is typically identical to the primary key, except that it is stored in a first data cell of a remote tuple, thus allowing the local tuple to be logically linked to the foreign tuple.

As understood within the context of the present invention, a graph database is a schema-less database in which data is organized as a set of nodes (objects) with properties (attributes or values). These nodes are linked to other nodes through edges, which describe the relationship between two nodes. While faster than a traditional relational database, graph databases are difficult and slow to construct, and due to the limited amount of information in the edges between nodes, have limited usefulness in large-scale operations.

Figure 2:
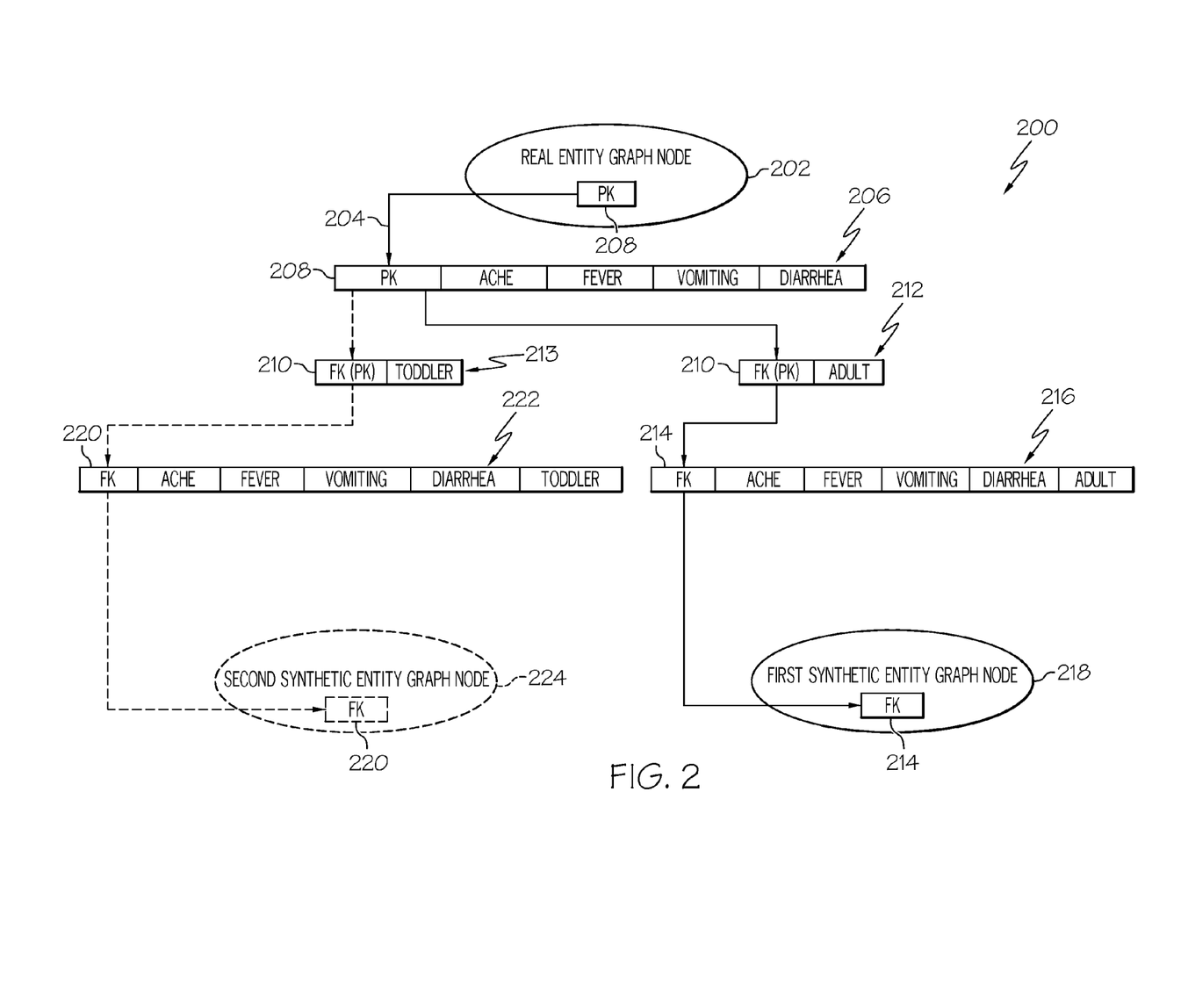
FIG. 2 illustrates a novel context-based graph-relational intersect derived (CB-GRID) database.

With reference now to FIG. 2, a novel and unique context-based graph-relational intersect derived (CB-GRID) database 200 in accordance with one embodiment of the present invention is presented. A real entity graph node 202 stores an identifier of a real physical entity. This identifier may be a name, a unique identification number, a social security number, a lot number, etc. The entity may be a person, a machine, a pharmaceutical product, an information technology (IT) system, etc. A pointer 204 points to a first tuple 206, which is part of a primary relational database, which non-contextually describes the real physical entity identified in real entity graph node 202. This pointer 204 utilizes a primary key 208, which is stored within the real entity graph node 202 without an attached tuple. That is, real entity graph 202 uses primary key 208 with pointer 204 to point to the same primary key 208 found in the first data cell of first tuple 206, which is part of a non-contextual primary relational database (which includes the first tuple 206 and possibly other tuples, which are not depicted).

Note again that the first tuple 206 only contains non-contextual data. For example, assume that the real entity graph node 202 identifies a medical patient, who has the non-contextual attributes ("ache, fever, vomiting, diarrhea") shown in first tuple 206. In order to provide meaningful context to the data in first tuple 206, the primary key 208 links to a foreign key 210, which in the present example provides the context of the patient being an adult in a second tuple 212 (which is part of a context relational database that includes the second tuple 212 and possibly other non-depicted tuples). The context "adult" is populated in the second tuple 212 using known context data (e.g., the age of the patient) about the medical patient. The foreign key 210 then acts as a primary key to point to another foreign key 214 (e.g., by using a lookup table that associates the foreign key 214 with the primary key 208 together with the foreign key 210), thus identifying a third tuple 216, which is part of a contextual entity relational database. In one embodiment, third tuple 216 is simply generated by combining the data content of the first tuple 206 with the data content of the second tuple 212. In either embodiment, third tuple 216 is a combination of the first tuple 206 and the second tuple 212. Third tuple 216 (i.e., a component of the contextual entity relational database) then uses its foreign key 214 (which is actually a primary key if third tuple 216 is created by simply combining the contents of the first tuple 206 with the second tuple 212) to locate and point to the same foreign key 214 that is stored in a first synthetic entity graph node 218. This first synthetic entity graph node 218 represents a model (i.e., not real) patient that exhibits all of the traits/attributes described in the third tuple 216. Thus, the foreign key 214 from third tuple 216 is a contextual tuple key that is stored within the first synthetic entity graph node 218, and associates the attributes (data) of third tuple 216 with an entity represented by the first synthetic entity graph node 218. As depicted in the CB-GRID database 300 in FIG. 3, this results in the linking of a specific and real medical patient 302 to a synthetic medical patient having a first type of disease 318 (e.g., an intestinal virus). That is, the non-contextual attributes ("ache, fever, vomiting, diarrhea") combined with the context (e.g., the patient is an "adult") allows the graph node for the medical patient 302 to be linked to a synthetic medical patient (e.g., a non-real exemplary patient) that has an intestinal virus, thus providing a medical diagnosis for the medical patient 302.

In one embodiment, after the linkage described herein is established between the real entity graph node 202 and one of the synthetic entity graph nodes (e.g., element 218 or 224), an edge (i.e., graph edge, not shown in the figures, which describes a relationship between the two nodes) can be created, thus promoting faster future use of the CB-GRID database 200.

Figure 3:
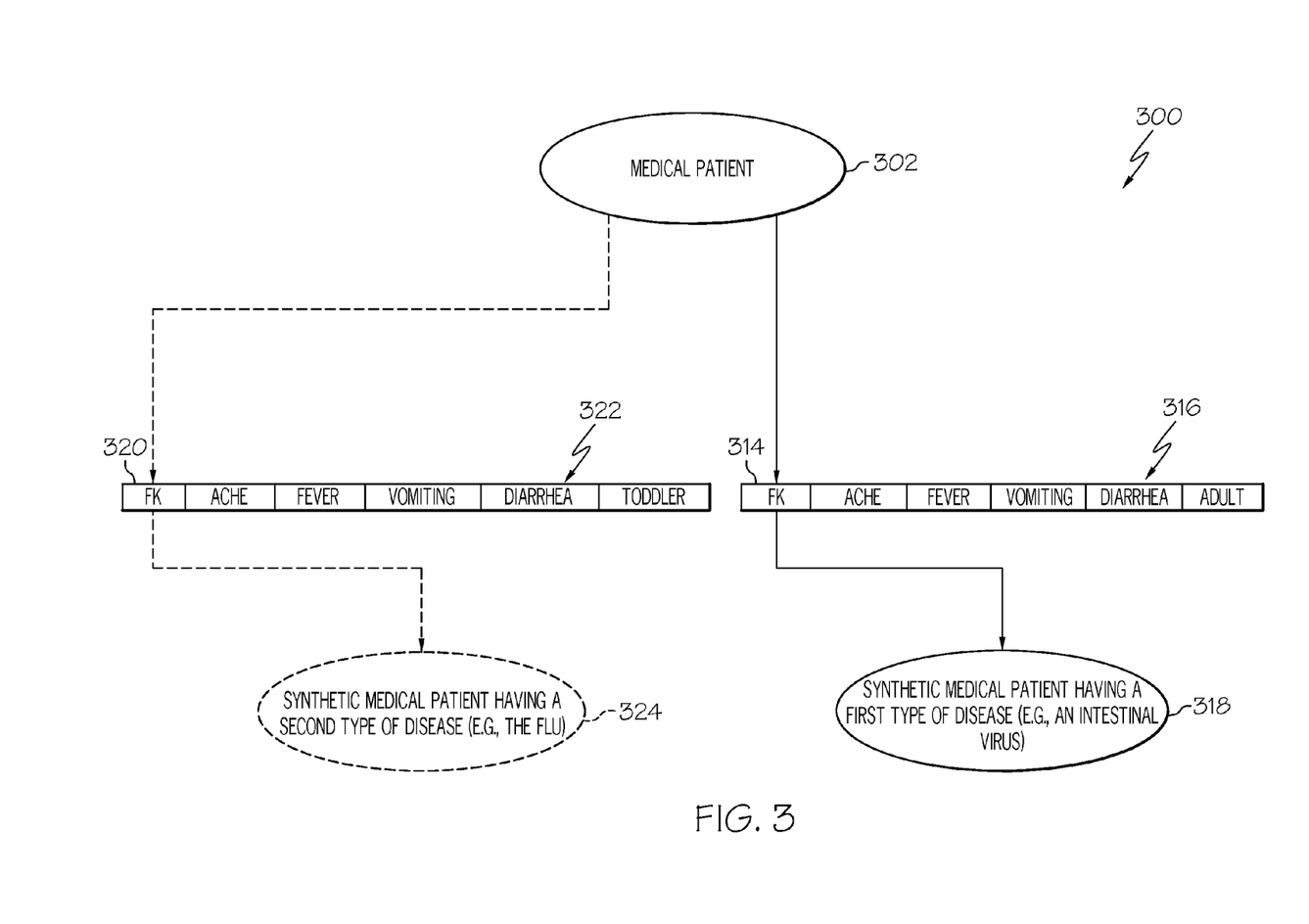
FIG. 3 depicts an exemplary medical use case of the CB-GRID database depicted in FIG. 2 using context related to a physical attribute of a medical patient.

Returning to FIG. 2, if the context data loaded into the second tuple 213 (which shares the same foreign key 210 as the second tuple 212) is "toddler" instead of "adult", this causes the foreign key 210 to act as a primary key used to link to foreign key 220 (e.g., using a lookup table) in a fourth tuple 222, which is another tuple in the contextual entity relational database to which the third tuple 216 belongs, and which contains data from the first tuple 206 and the second tuple 213. Again, note that second tuple 213 is essentially the same second tuple 212 described above, except that the second data cell is now populated with different data (i.e., "toddler"

instead of "adult"). Using what is essentially the same tuple with different data entries allows the primary key 208 to always point to the same foreign key 210, thus allowing the second tuple 212 to be dynamically modified (i.e., to become second tuple 213). Thus, in the example shown in FIG. 2, the context data "toddler" results in the dynamic modification of the second tuple 212 into second tuple 213, which causes primary key 208 from the first tuple 206 to ultimately point to the fourth tuple 222 instead of the third tuple 216 by use of a lookup table or other logic that dynamically links the foreign/primary key 210 to the foreign key 220 in fourth tuple 222 instead of foreign key 214 in third tuple 216. This causes the foreign key 220 in the fourth tuple 222 to locate the same foreign key 220 located within a second synthetic entity graph node 224, thus linking the real entity graph node 202 to the second synthetic entity graph node 224. For example, as shown in FIG. 3, the medical patient, whose context is now defined as being a "toddler" instead of an "adult", is linked by the fourth tuple 222 to a synthetic medical patient having a second type of disease 324 (e.g., the flu). That is, the non-contextual attributes ("ache, fever, vomiting, diarrhea") combined with the context (e.g., the patient is a "toddler") allows the graph node for the medical patient 302 to be linked to a synthetic medical patient (e.g., a non-real exemplary patient) that has the flu, thus providing a medical diagnosis for the medical patient 302. That is, a patient having the symptoms of "ache, fever, vomiting, diarrhea" is likely to have the flu if he is a toddler, while he is more likely to have an intestinal virus if he is an adult. The presently described CB-GRID database enables the logical linking of graph nodes to make this association/diagnosis.

Figure 4:
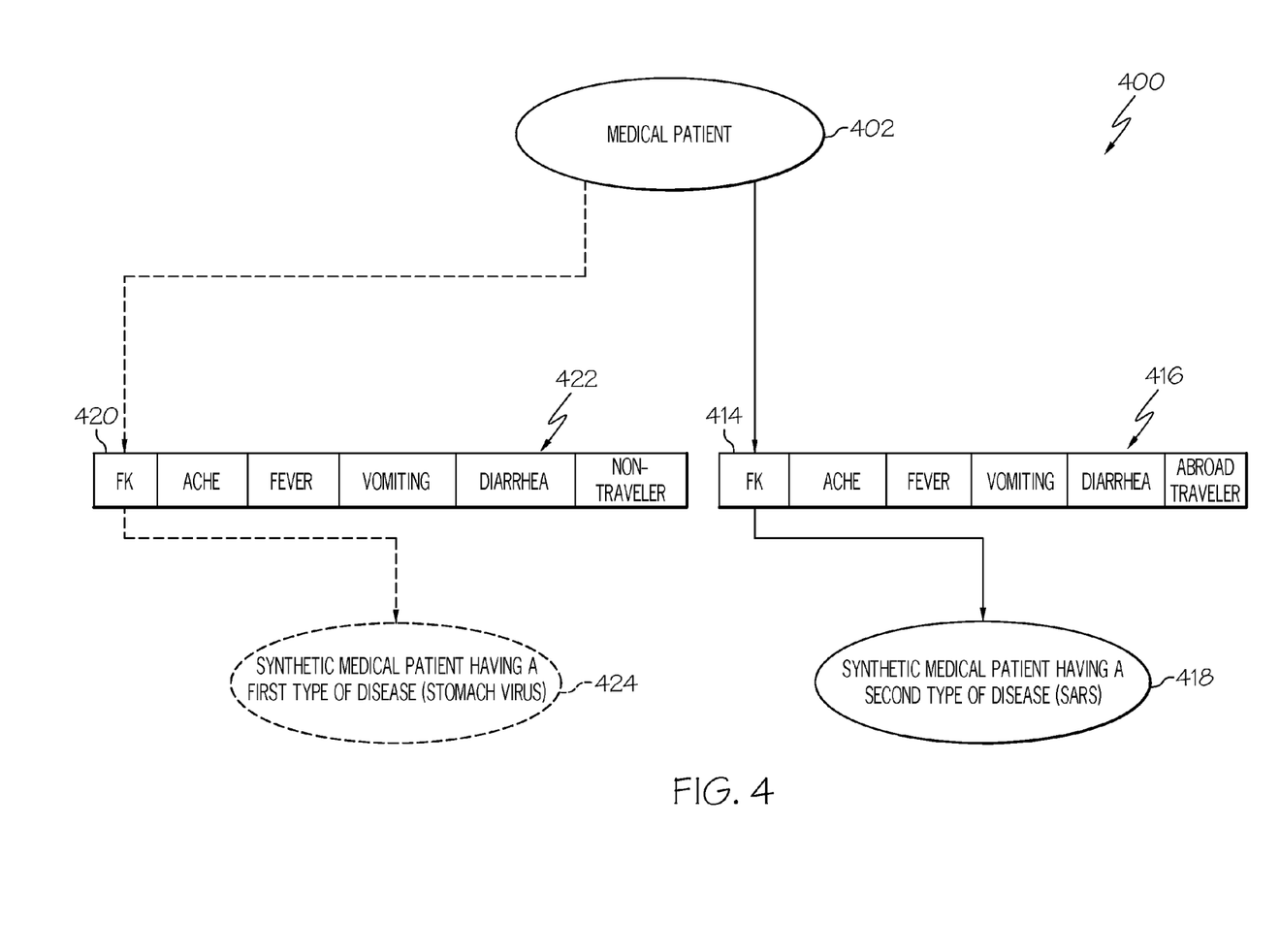
FIG. 4 depicts an exemplary medical use case of the CB-GRID database depicted in FIG. 2 using context related to an activity attribute of a medical patient.
Figure 5:
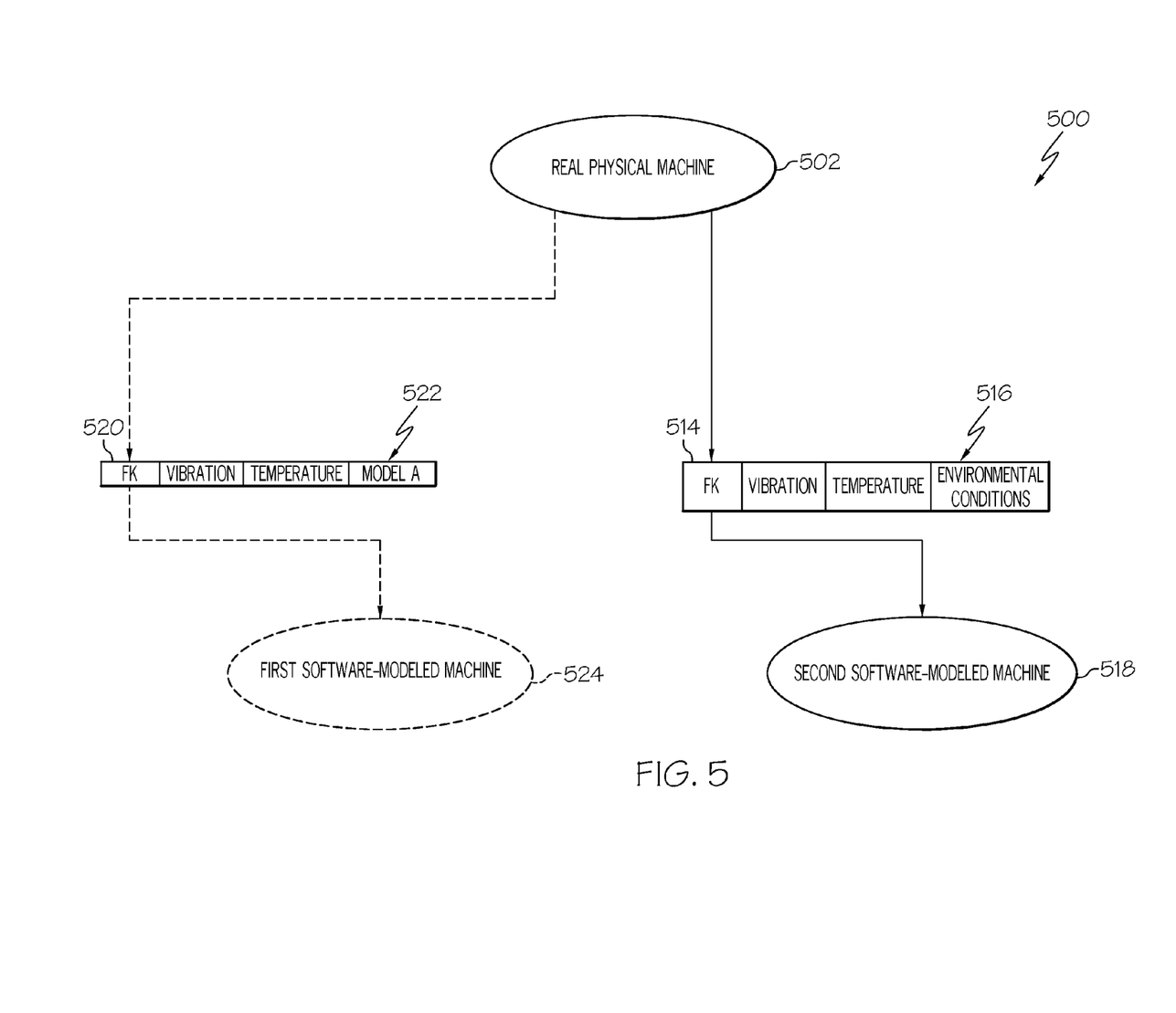
FIG. 5 depicts an exemplary automotive use case of the CB-GRID database depicted in FIG. 2.

With reference now to the CB-GRID database 400 depicted in FIG. 4, assume that the context provided in the context relational database (e.g., second tuple 212) was not a physical attribute about the medical patient (e.g., the patient is either an "adult" or a "toddler"), but rather describes a past activity (e.g., traveling abroad) of the patient. In this example, data from the context relation database (e.g., second tuple 212 described above) causes the creation of either a non-traveler tuple 422 (having a foreign key 420) or an abroad traveler tuple 416 (having a foreign key 414) associated with a medical patient 402. Depending on which tuple is linked to the medical patient 402 (e.g., an entity graph node describing this medical patient), then the medical patient is either linked to a graph node of a first synthetic medical patient 418 (e.g., a non-real patient that is defined by the data found in the contextual entity relational database containing non-traveler tuple 422 and abroad traveler tuple 416) having a first type of disease (e.g., a stomach virus if the patient has not been traveling), or to a synthetic medical patient 424 having a second type of disease (e.g., severe acute respiratory syndrome (SARS) if the patient has been traveling abroad to a country known to be having an outbreak of this disease). Thus, this contextual linking of graph nodes enables the diagnosis of a particular disease.

While the present invention has been described in exemplary manner as used as a medical diagnostic tool, the present invention is also useful in other types of evaluation processes. For example, consider the CD-GRID database 500 depicted in FIG. 5. In this example, the real entity graph node is for a real physical machine 502, such as an automobile engine. Using the steps described above and herein (e.g., using the primary relational database and the context relational database to create the contextual entity relational database that holds context-based tuples), the graph node for the real physical machine 502 may point to the foreign key 520 of context-based tuple 522, or it may point to the foreign key 514 of context-based tuple 516. That is, if the context relational database (not shown in FIG. 5, but described above) indicates that the real physical machine 502 is producing a certain level of vibration at a certain temperature (as detected by sensors on the real physical machine), and the real physical machine is a particular model (e.g., a particular make, size, year, model of automobile engine), then the graph node for the real physical machine 502 is linked by the context-based tuple 522 to a graph node for a first software-modeled machine 518. Alternatively, the context may not be related to a physical attribute of the machine (e.g., the model type), but rather the context is related to the environmental conditions (e.g., hot, dusty, wet, etc.) that the machine is operating within. Thus, in this embodiment, if the context relational database (not shown in FIG. 5, but described above) indicates that the real physical machine 502 is producing a certain level of vibration at a certain temperature (as detected by sensors on the real physical machine), and the real physical machine is operating within certain physical environmental conditions (e.g., the local environment is hot, dusty, wet, etc.), then the graph node for the real physical machine 502 is linked by the context-based tuple 516 to a graph node for a second software-modeled machine 524. The first software-modeled machine 518 and/or the second software-modeled machine 524 may describe a machine that is operating outside of nominal parameters (e.g., is running too hot, is using too much fuel, etc.). Thus, by linking the real physical machine 502 to one or both of these graph nodes (i.e., for the first software-modeled machine 518 and/or the second software-modeled machine 524), a fault being experienced by the real physical machine 502 can be identified.

Figure 6:
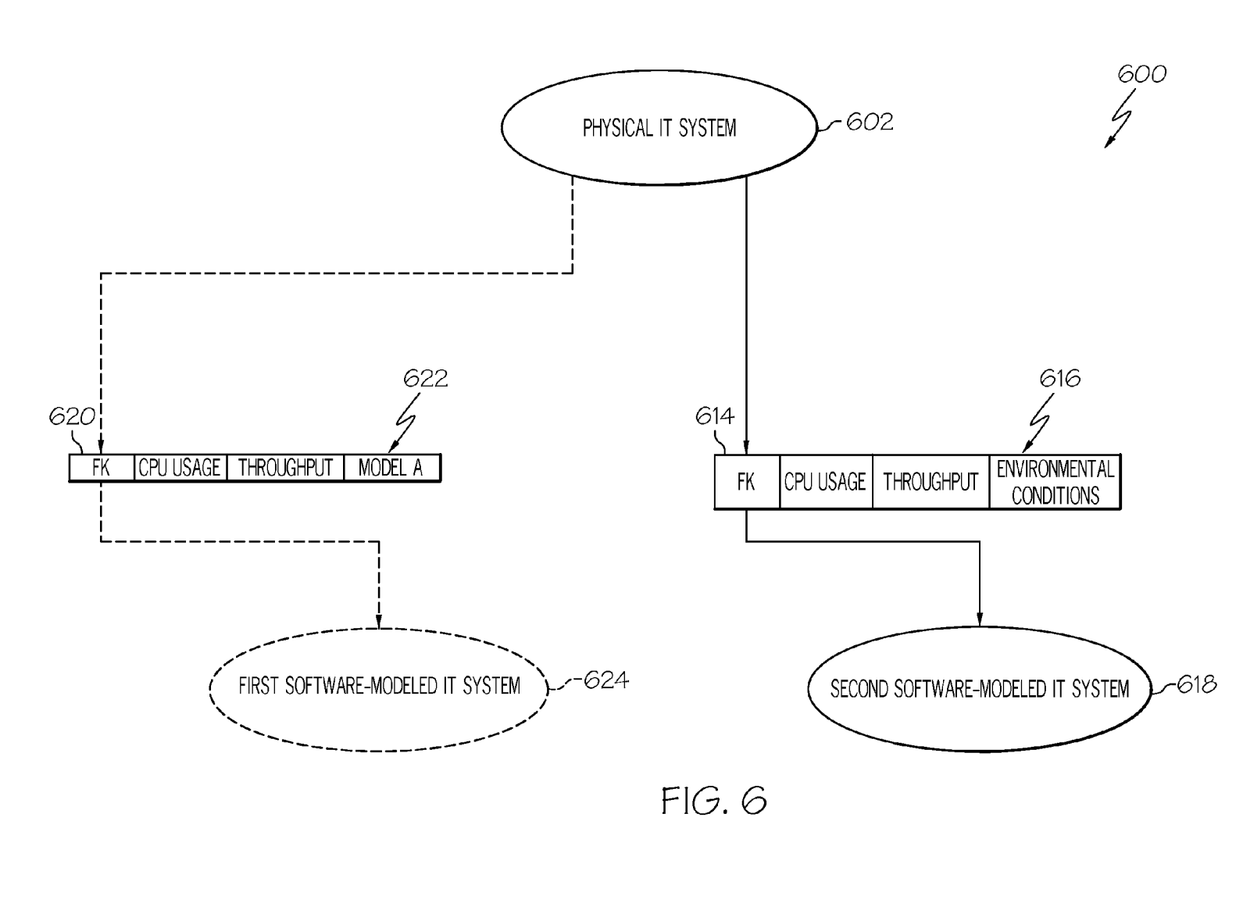
FIG. 6 depicts an exemplary information technology (IT) use case of the CB-GRID database depicted in FIG. 2.

With reference now to FIG. 6, an exemplary information technology (IT) system use case of the CB-GRID database depicted in FIG. 2 is presented as CB-GRID database 600. In this example, the real entity graph node is for a real physical IT system 602, such as a computer network. Using the steps described above and herein (e.g., using the primary relational database and the context relational database to create the contextual entity relational database that holds context-based tuples), the graph node for the physical IT system 602 may point to the foreign key 620 of context-based tuple 622, or it may point to the foreign key 614 of context-based tuple 616. That is, if the context relational database (not shown in FIG. 6, but described above) indicates that the physical IT system 602 is using central processing unit (CPU) capacity at a certain level with some particular throughput (e.g., a certain number of instructions are being executed per unit of time), and the physical IT machine is a particular model (e.g., a particular make, model, release version of networked system), then the graph node for the physical IT system 602 is linked by the context-based tuple 622 to a graph node for a first software-modeled IT system 618. Alternatively, the context may not be related to a physical attribute of the machine (e.g., the model type), but rather the context is related to the environmental conditions (e.g., hot, freezing, dusty, wet, etc.) that the IT system is operating within. Thus, in this embodiment, if the context relational database (not shown in FIG. 5 but described above) indicates that the physical IT system 602 is experiencing a certain throughput at some particular CPU usage level (as detected by sensors, flags, monitors, etc. within the physical IT system), and the physical IT system is operating within certain physical environmental conditions (e.g., the local environment is hot, freezing, dusty, wet, etc.), then the graph node for the physical IT system 602 is linked by the context-based tuple 616 to a graph node for a second software-modeled IT system 624. The first software-modeled IT system 618 and/or the second software-modeled IT system 624 may describe a network system that is operating outside of nominal parameters (e.g., is using too much CPU time, is running too slow, etc.). Thus, by linking the physical IT system 602 to one or both of these graph nodes (i.e., for the first software-modeled IT system 618 and/or the second software-modeled IT system 624), a fault being experienced by the real physical IT system 602 can be identified.

Figure 7:
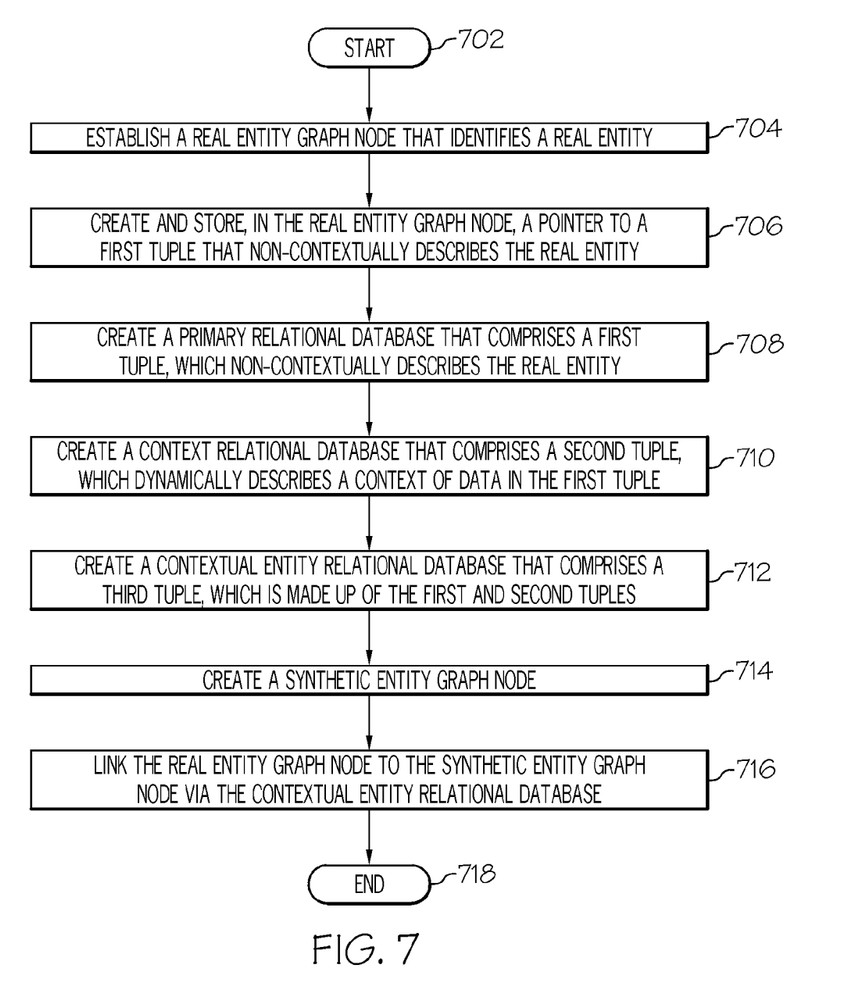
FIG. 7 is a high-level flow chart of one or more steps performed by a computer processor to create the CB-GRID database depicted in FIG. 2.

With reference now to FIG. 7, a high-level flow chart of one or more steps performed by a computer processor to create the CB-GRID database depicted in FIG. 2 is presented. After initiator block 702, a real entity node (e.g., a graph node) that identifies a real entity is established (block 704). This real entity graph node identifies a real entity, such as a medical patient, a unit of equipment, an IT system, etc. As described in block 706, a pointer is created and stored in the real entity graph node. This pointer allows the real entity graph node to point to a primary key in a first tuple (e.g., first tuple 206 shown in FIG. 2 above) that non-contextually describes the real entity.

As described in block 708, a primary relational database (e.g., a primary relational database that includes the first tuple 206 shown in FIG. 2) is created. This primary relational database includes the first tuple that non-contextually describes the real entity identified by the real entity graph node. As described herein, the first tuple also contains the primary key that is pointed to by the real entity graph node.

As described in block 710, a context relational database that contains a second tuple is created. This context relational database (e.g., second tuple 212 described above) includes 1) a foreign key that matches the primary key in the primary relational database, and 2) context data that describes a context (e.g., physical context, environmental context, etc.) of the real entity identified by the real entity graph node.

As described in block 712, a contextual entity relational database is then created based on data from the primary relational database (e.g., using data from the first tuple 206 shown in FIG. 2) combined with data from the context relational database (e.g., using data from the second tuple 212 shown in FIG. 2).

As described in block 714, one or more synthetic entity graph nodes (e.g., first synthetic entity graph node 218 and/or second synthetic graph node 224 depicted in FIG. 2) are then created. This synthetic entity graph node describes a synthetic entity (i.e., "non-real") that is described by data in the contextual entity relational database.

As described in block 716, the real entity graph node is then linked to the synthetic entity graph node by the contextual entity relational database (e.g., using a tuple such as third tuple 216 or fourth tuple 222 shown in FIG. 2), thus allowing the real entity graph node to be linked to (i.e., associated with) a specific synthetic entity graph node. This linking/association can then be used to identify whether or not the real entity is operating at nominal (i.e., pre-determined as being "normal") conditions, etc. The process ends at terminator block 718.

Figure 8:
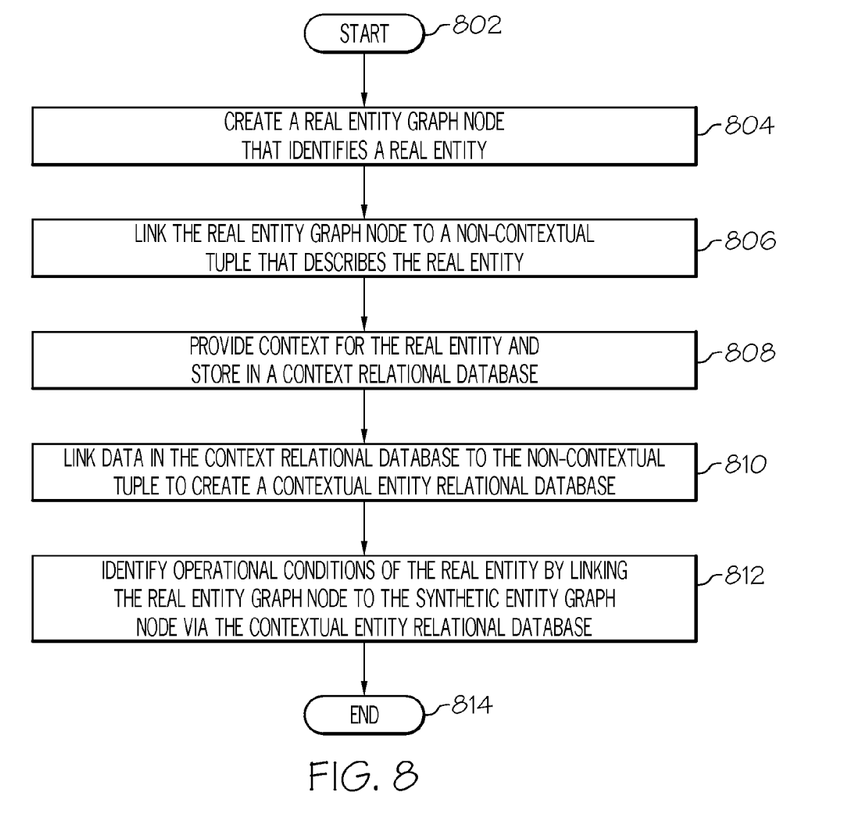
FIG. 8 is a high-level flow chart of one or more steps performed by a computer processor for utilizing the CB-GRID database depicted in FIG. 2 to identify operational conditions of a real physical entity.

For example, FIG. 8 presents a high-level flow chart of one or more steps performed by a computer processor for utilizing the CB-GRID database depicted in FIG. 2 to identify operational conditions of a real physical entity. After initiator block 802, a real entity graph node that identifies a real entity is created (block 804), using the processes described herein. The real entity graph node is linked to a non-contextual tuple (part of a primary relational database) that describes the real entity (block 806). Context (e.g., dynamically adjustable variables) about the real entity then populate a context relational database (block 808), allowing the creation of a contextual entity relational database from the non-contextual tuple and the context relational database (block 810). As described herein, by linking the real entity graph node to the synthetic entity graph node via the contextual entity relational database, operational conditions (both nominal and non-nominal conditions) of the real entity are identified (block 812). The process ends at terminator block 814.

In one embodiment and as described herein, the present invention enables the creation and use of a novel type of graph database, in which relations between graph nodes are not described in links that merely describe how existing graph nodes are related, but rather provides a context-based use of relational databases and their tuples to determine which graph nodes should be linked. In one embodiment, this allows a user to identify context-based descriptions of a particular real entity's operational conditions.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A database computer system comprising a context-based graph-relational intersect derived (CB-GRID) database, wherein the CB-GRID database associates a real entity graph node to a synthetic entity graph node, and wherein the CB-GRID database in the database computer system comprises: one or more processors, wherein said one or more processors implement the CB-GRID database; a real entity graph node, wherein the real entity graph node identifies a real entity, and wherein the real entity graph node comprises a pointer to a primary key in a first tuple that non-contextually describes the real entity; a primary relational database, wherein the primary relational database comprises the first tuple that non-contextually describes the real entity, and wherein the first tuple contains the primary key; a context relational database, wherein the context relational database comprises a second tuple that contains a foreign key that matches the primary key in the primary relational database, and wherein the second tuple dynamically describes a context of data in the first tuple; a contextual entity relational database, wherein the contextual entity relational database comprises a third tuple that contains data from the first tuple and the second tuple, and wherein the third tuple comprises a contextual tuple key; a synthetic entity graph node, wherein the synthetic entity graph node is linked to the contextual entity relational database by the contextual tuple key, wherein the synthetic entity graph node describes a synthetic entity that is described by data in the contextual entity relational database, and wherein the contextual entity relational database links the real entity graph node to the synthetic entity graph node, wherein the real entity is a physical machine, wherein the synthetic entity graph node describes a software-modeled machine that is operating outside of nominal parameters, and wherein the CB-GRID database in the database computer system further comprises: output data from a sensor on the physical machine stored in the first tuple; model type data describing a model type of the physical machine stored in the second tuple; and software-modeled machine descriptor data stored in the third tuple, wherein the contextual entity relational database links the physical machine to the software-modeled machine that is operating outside of the nominal parameters.

2. The database computer system of claim 1, wherein the real entity is a physical information technology (IT) system, wherein the synthetic entity graph node describes a software-modeled IT system that is operating outside of nominal parameters, and wherein the CB-GRID database in the database computer system further comprises: output data from a sensor in the physical IT system stored in the first tuple; model type data describing a model type of the physical IT system stored in the second tuple; and software-modeled IT system descriptor data stored in the third tuple, wherein the contextual entity relational database links the physical IT system to the software-modeled IT system that is operating outside of the nominal parameters.

3. The database computer system of claim 1, wherein the real entity is a physical information technology (IT) system, wherein the synthetic entity graph node describes a software-modeled IT system that is operating outside of nominal parameters, and wherein the CB-GRID database in the database computer system further comprises: output data from a sensor in the physical IT system stored in the first tuple; environmental data describing an external physical environment of the physical IT system stored in the second tuple; and software-modeled IT system descriptor data stored in the third tuple, wherein the contextual entity relational database links the physical IT system to the software-modeled IT system that is operating outside of the nominal parameters.

4. A computer program product for creating a context-based graph-relational intersect derived (CB-GRID) database for associating a real entity graph node to a synthetic entity graph node in a database system, the computer program product comprising: a non-transitory computer readable storage medium; first program instructions to establish a real entity graph node, wherein the real entity graph node identifies a real entity; second program instructions to create and store a pointer in the real entity graph node, wherein the pointer points to a primary key in a first tuple that non-contextually describes the real entity; third program instructions to create a primary relational database, wherein the primary relational database comprises the first tuple that non-contextually describes the real entity, and wherein the first tuple contains the primary key; fourth program instructions to create a context relational database, wherein the context relational database comprises a second tuple that contains a foreign key that matches the primary key in the primary relational database, and wherein the second tuple dynamically describes a context of data in the first tuple; fifth program instructions to create a contextual entity relational database, wherein the contextual entity relational database comprises a third tuple that contains data from the first tuple and the second tuple, and wherein the third tuple comprises a contextual tuple key; sixth program instructions to create a synthetic entity graph node, wherein the synthetic entity graph node is linked to the contextual entity relational database by the contextual tuple key, wherein the synthetic entity graph node describes a synthetic entity that is described by data in the contextual entity relational database, and wherein the contextual entity relational database links the real entity graph node to the synthetic entity graph node, wherein the real entity is a physical machine, and wherein the synthetic entity graph node describes a software-modeled machine that is operating outside of nominal parameters; seventh program instructions to receive and store output data from a sensor on the physical machine stored in the first tuple; eighth program instructions to receive and store model type data describing a model type of the physical machine stored in the second tuple; and ninth program instructions to receive and store software-modeled machine descriptor data stored in the third tuple, wherein the contextual entity relational database links the physical machine to the software-modeled machine that is operating outside of the nominal parameters; and wherein the first, second, third, fourth, fifth, sixth, seventh, eighth, and ninth program instructions are stored on the non-transitory computer readable storage medium.

5. The computer program product of claim 4, further comprising: tenth program instructions to receive and store output data from a sensor on the physical machine stored in the first tuple; eleventh program instructions to receive and store environmental data describing an external physical environment of the physical machine stored in the second tuple; and twelfth program instructions to receive and store software-modeled machine descriptor data stored in the third tuple, wherein the contextual entity relational database links the physical machine to the software-modeled machine that is operating outside of the nominal parameters; and wherein the seventh, eighth, and ninth program tenth, eleventh, and twelfth instructions are stored on the non-transitory computer readable storage medium.

6. The computer program product of claim 4, wherein the real entity is a physical information technology (IT) system, wherein the synthetic entity graph node describes a software-modeled IT system that is operating outside of nominal parameters, and wherein the computer program product further comprises: tenth program instructions to receive and store output data from a sensor in the physical IT system stored in the first tuple; eleventh program instructions to receive and store model type data describing a model type of the physical IT system stored in the second tuple; and twelfth program instructions to receive and store software-modeled IT system descriptor data stored in the third tuple, wherein the contextual entity relational database links the physical IT system to the software-modeled IT system that is operating outside of the nominal parameters; and wherein the seventh, eighth, and ninth program tenth, eleventh, and twelfth instructions are stored on the non-transitory computer readable storage medium.

7. The computer program product of claim 4, wherein the real entity is a physical information technology (IT) system, wherein the synthetic entity graph node describes a software-modeled IT system that is operating outside of nominal parameters, and wherein the computer program product further comprises: tenth program instructions to receive and store output data from a sensor in the physical IT system stored in the first tuple; eleventh program instructions to receive and store environmental data describing an external physical environment of the physical IT system stored in the second tuple; and twelfth program instructions to receive and store software-modeled IT system descriptor data stored in the third tuple, wherein the contextual entity relational database links the physical IT system to the software-modeled IT system that is operating outside of the nominal parameters; and wherein the tenth, eleventh, and twelfth program instructions are stored on the non-transitory computer readable storage medium.

8. A computer system comprising: a central processing unit (CPU), a computer readable memory, and a non-transitory computer readable storage medium; first program instructions to establish a real entity graph node, wherein the real entity graph node identifies a real entity; second program instructions to create and store a pointer in the real entity graph node, wherein the pointer points to a primary key in a first tuple that non-contextually describes the real entity; third program instructions to create a primary relational database, wherein the primary relational database comprises the first tuple that non-contextually describes the real entity, and wherein the first tuple contains the primary key; fourth program instructions to create a context relational database, wherein the context relational database comprises a second tuple that contains a foreign key that matches the primary key in the primary relational database, and wherein the second tuple dynamically describes a context of data in the first tuple; fifth program instructions to create a contextual entity relational database, wherein the contextual entity relational database comprises a third tuple that contains data from the first tuple and the second tuple, and wherein the third tuple comprises a contextual tuple key; sixth program instructions to create a synthetic entity graph node, wherein the synthetic entity graph node is linked to the contextual entity relational database by the contextual tuple key, wherein the synthetic entity graph node describes a synthetic entity that is described by data in the contextual entity relational database, wherein the contextual entity relational database links the real entity graph node to the synthetic entity graph node, wherein the real entity is a physical machine, and wherein the synthetic entity graph node describes a software-modeled machine that is operating outside of nominal parameters; seventh program instructions to receive and store output data from a sensor on the physical machine stored in the first tuple; eighth program instructions to receive and store environmental data describing an external physical environment of the physical machine stored in the second tuple; and ninth program instructions to receive and store software-modeled machine descriptor data stored in the third tuple, wherein the contextual entity relational database links the physical machine to the software-modeled machine that is operating outside of the nominal parameters; and wherein the first, second, third, fourth, fifth, sixth, seventh, eighth, and ninth program instructions are stored on the non-transitory computer readable storage medium for execution by the CPU via the computer readable memory.

9. The computer system of claim 8, further comprising: tenth program instructions to receive and store output data from a sensor on the physical machine stored in the first tuple; eleventh program instructions to receive and store model type data describing a model type of the physical machine stored in the second tuple; and twelfth program instructions to receive and store software-modeled machine descriptor data stored in the third tuple, wherein the contextual entity relational database links the physical machine to the software-modeled machine that is operating outside of the nominal parameters; and wherein the seventh, eighth, and ninth tenth, eleventh, and twelfth program instructions are stored on the non-transitory computer readable storage medium for execution by the CPU via the computer readable memory.

10. The computer system of claim 8, wherein the real entity is a physical information technology (IT) system, wherein the synthetic entity graph node describes a software-modeled IT system that is operating outside of nominal parameters, and wherein the computer system further comprises: tenth program instructions to receive and store output data from a sensor in the physical IT system stored in the first tuple; eleventh program instructions to receive and store model type data describing a model type of the physical IT system stored in the second tuple; and twelfth program instructions to receive and store software-modeled IT system descriptor data stored in the third tuple, wherein the contextual entity relational database links the physical IT system to the software-modeled IT system that is operating outside of the nominal parameters; and wherein the tenth, eleventh, and twelfth program instructions are stored on the non-transitory computer readable storage medium for execution by the CPU via the computer readable memory.

* * * * *